United States Patent [19]

Fischer et al.

[11] Patent Number: 5,533,203
[45] Date of Patent: Jul. 2, 1996

[54] START OF PACKET RECEIVE INTERRUPT FOR ETHERNET CONTROLLER

[75] Inventors: Matthew J. Fischer, Mt. View; Glen Gibson, San Ramon; Jeffrey Dwork; Thomas J. Runaldue, both of San Jose, all of Calif.

[73] Assignee: Advanced Micro Devices, Inc., Sunnyvale, Calif.

[21] Appl. No.: 437,068

[22] Filed: May 9, 1995

Related U.S. Application Data

[63] Continuation of Ser. No. 147,370, Nov. 5, 1993, abandoned.

[51] Int. Cl.$^6$ ............................. G06F 13/00; G06F 15/173
[52] U.S. Cl. ................... 395/250; 364/239.1; 364/284.0; 364/284.1; 364/284.4
[58] Field of Search .................................. 395/200, 250, 395/275

[56] References Cited

U.S. PATENT DOCUMENTS

| 4,032,899 | 6/1977 | Jenny | 395/325 |
|---|---|---|---|
| 4,075,691 | 2/1978 | Davis | 395/275 |
| 4,493,021 | 1/1985 | Agrawal | 395/200 |
| 5,105,382 | 4/1992 | Ogasawara | 395/250 |
| 5,163,132 | 11/1992 | DuLac | 395/275 |
| 5,339,439 | 8/1994 | Latimer | 395/275 |

Primary Examiner—David Y. Eng
Attorney, Agent, or Firm—Benman Collins & Sawyer

[57] ABSTRACT

A system is provided for ensuring that a ethernet controller operates to optimize bus latency and central processing unit (CPU) utilization in a network environment when reviewing data packets. Through the efficient use of a plurality of buffer memories and a driver, the bus utilization in conjunction with the controller the system provides for the receipt and transfer of data packets from the ethernet controller during the latency period of the network. In so doing, the overall performance of the network is enhanced.

5 Claims, 11 Drawing Sheets

| Descriptor | |
|---|---|
| Descriptor #9 | OWN = 0  STP = 0<br>SIZE = S6 |
| Descriptor #8 | OWN = 1  STP = 0<br>SIZE = S1 + S2 + S3 + S4 |
| Descriptor #7 | OWN = 1  STP = 1<br>SIZE = A - (S1 + S2 + S3 + S4 + S6) |
| Descriptor #6 | OWN = 0  STP = 0<br>SIZE = S6 |
| Descriptor #5 | OWN = 1  STP = 0<br>SIZE = S1 + S2 + S3 + S4 |
| Descriptor #4 | OWN = 1  STP = 1<br>SIZE = A - (S1 + S2 + S3 + S4 + S6) |
| Descriptor #3 | OWN = 0  STP = 0<br>SIZE = S6 |
| Descriptor #2 | OWN = 1  STP = 0<br>SIZE = S1 + S2 + S3 + S4 |
| Descriptor #1 | OWN = 1  STP = 1<br>SIZE = A - (S1 + S2 + S3 + S4 + S6) |

WHERE:

- A = Expected message size in bytes
- S1 = Interrupt latency
- S2 = Application call latency
- S3 = Time needed for driver to write to third descriptor
- S4 = Time needed for driver to copy data from buffer #1 to application buffer space
- S6 = Time needed for driver to copy data from buffer #2 to application buffer space

FIG. 5

TABLE 1

| descriptor number | before the frame arrives | | | after the frame arrived | | | comments (after frame arrival) |
|---|---|---|---|---|---|---|---|
| | OWN | STP | ENP† | OWN | STP | ENP† | |
| 1 | 1 | 1 | X | 0 | 1 | 0 | bytes 1-800 |
| 2 | 1 | 0 | X | 0 | 0 | 0 | bytes 801-1000 |
| 3 | 0 | 0 | X | 0 | 0 | 1 | bytes 1001-1060 |
| 4 | 1 | 1 | X | 1 | 1 | X | controller's current location |
| 5 | 1 | 0 | X | 1 | 0 | X | not yet used |
| 6 | 0 | 0 | X | 0 | 0 | X | not yet used |
| etc | 1 | 1 | X | 1 | 1 | X | not yet used |

TABLE 2

| descriptor number | before the frame arrives | | | after the frame arrived | | | comments (after frame arrival) |
|---|---|---|---|---|---|---|---|
| | OWN | STP | ENP† | OWN | STP | ENP† | |
| 1 | 1 | 1 | X | 0 | 1 | 0 | bytes 1-800 |
| 2 | 1 | 0 | X | 0 | 0 | 1 | bytes 801-900 |
| 3 | 0 | 0 | X | 0 | 0 | ?* | discarded buffer |
| 4 | 1 | 1 | X | 1 | 1 | X | controller's current location |
| 5 | 1 | 0 | X | 1 | 0 | X | not yet used |
| 6 | 0 | 0 | X | 0 | 0 | X | not yet used |
| etc | 1 | 1 | X | 1 | 1 | X | not yet used |

TABLE 3

| descriptor number | before the frame arrives | | | after the frame arrived | | | comments (after frame arrival) |
|---|---|---|---|---|---|---|---|
| | OWN | STP | ENP† | OWN | STP | ENP† | |
| 1 | 1 | 1 | X | 0 | 1 | 1 | bytes 1-100 |
| 2 | 1 | 0 | X | 0 | 0 | 0** | discarded buffer |
| 3 | 0 | 0 | X | 0 | 0 | ?* | discarded buffer |
| 4 | 1 | 1 | X | 1 | 1 | X | controller's current location |
| 5 | 1 | 0 | X | 1 | 0 | X | not yet used |
| 6 | 0 | 0 | X | 0 | 0 | X | not yet used |
| etc | 1 | 1 | X | 1 | 1 | X | not yet used |

FIG. 6

| Descriptor | |
|---|---|
| Descriptor #9 | OWN = 0      STP = 0<br>SIZE = 1518 - (S1 + S2 + S3 + S4 + HEADER_SIZE) |
| Descriptor #8 | OWN = 1      STP = 0<br>SIZE = S1 + S2 + S3 + S4 |
| Descriptor #7 | OWN = 1      STP = 1<br>SIZE = HEADER_SIZE (minimum 64 bytes) |
| Descriptor #6 | OWN = 0      STP = 0<br>SIZE = 1518 - (S1 + S2 + S3 + S4 + HEADER_SIZE) |
| Descriptor #5 | OWN = 1      STP = 0<br>SIZE = S1 + S2 + S3 + S4 |
| Descriptor #4 | OWN = 1      STP = 1<br>SIZE = HEADER_SIZE (minimum 64 bytes) |
| Descriptor #3 | OWN = 0      STP = 0<br>SIZE = 1518 - (S1 + S2 + S3 + S4 + HEADER_SIZE) |
| Descriptor #2 | OWN = 1      STP = 0<br>SIZE = S1 + S2 + S3 + S4 |
| Descriptor #1 | OWN = 1      STP = 1<br>SIZE = HEADER_SIZE (minimum 64 bytes) |

WHERE:

- A = Expected message size in bytes
- S1 = Interrupt latency
- S2 = Application call latency
- S3 = Time needed for driver to write to third descriptor
- S4 = Time needed for driver to copy data from buffer #1 to application buffer space
- S6 = Time needed for driver to copy data from buffer #2 to application buffer space

FIG. 8

START OF PACKET RECEIVE INTERRUPT FOR ETHERNET CONTROLLER

This is a continuation of application Ser. No. 08/147,370, filed Nov. 5, 1993, now abandoned.

FIELD OF THE INVENTION

The present invention relates to the operation of an ethernet controller and more particularly to the efficient transfer of data by such a controller within a network environment.

BACKGROUND OF THE INVENTION

In some types of networks, e.g. ETHERNET®, once a node begins to transmit or receive a data packet, the data must continue uninterrupted, and at a speed determined by the network, until the entire packet has been processed. A node can be, for example, a computer attached to the network. The computer typically has a network interface coupled to the network and to an internal system bus. The various components, subsystems, and peripherals of the computer are typically coupled to the system bus as well.

The components typically include a storage device and a processor of some type. Most computer systems move all data between the various components by use of the system bus. The access to the system bus is strictly controlled, often through use of an interrupt system in which various services have an associated priority, and devices are awarded use of the system bus based partially on their priority level.

For data packets received from the network, the computer transfers the data to the storage device through the system bus to await further processing. Immediate access to the storage device is not guaranteed because the other computer components also use the system bus. The storage device access, through the system bus, is said to have variable latency or delay because the access time cannot be predicted in advance.

A well known solution to this problem of variable latency is to provide the computer with a buffer memory between the network and the system bus. When the computer denies the network interface access to the system bus, the network interface stores the data in the buffer memory. When the computer grants access to the storage device through the system bus, the computer empties the buffer memory, and "catches up" with the network. It is possible for the computer to catch up because the data speed of the system bus is typically much faster than the effective data transmission rate of the network. An overflow condition develops when the computer denies the buffer memory access to the system bus for too long and the buffer memory fills to capacity. Additional data from the network is lost because there is no way to suspend the receipt of data. The network protocol handles this situation by detecting an overflow condition and causes a node to retransmit the entire data packet. It is desirable, therefore, to minimize the number of overflow conditions of the computer system to improve the network efficiency.

A similar difficulty is presented during transmission of data from the storage device, to the network. Once network access is granted, the computer must send data at a predetermined fixed rate, but the storage device requires the cooperation of the system bus. The variable latency problem of the system bus interfered with reliable transmissions. Another buffer memory in the transmit path allows the network interface to supply a limited amount of data to the network even when the computer denies access to the storage device. For transmissions to the fixed-speed network, there is the possibility for buffer memory to underflow when the computer denies the buffer memory access to the storage for too long and the network interface completely empties the buffer memory. Upon detecting an underflow, the transmission stops and the network purges the incomplete data packet. The network requests that the computer retransmit the data packet.

Traditional designs for managing buffer memories in communication systems treat transmit and receive operations as completely independent of each other. If a receive operation is in progress, a buffer memory manager gives priority to completion of the receive operation, at least until the node receives and stores a complete data packet in the storage device. Only then is any attention given to possible transmit operations, but if another receive operation begins, the computer aborts the transmit operation. In a busy network, receive operations monopolize the buffer memory manager's time, and, consequently, it is possible to delay indefinitely transmissions from the computer. This problem is sometimes referred to as receive lockout of transmission.

Another solution interleaves receive and transmit operations relative to the storage device. This solution allows the computer to begin a transmission operation even though all data transfers to the storage device, due to the receive operations, have not been completed. This solution has the advantage that it makes more aggressive use of the network communication channel, but has the disadvantage that it is more prone to overflows and underflows, because it requires the system bus to carry more data in the same period of time.

What is still needed in this field is a more efficient buffer memory management system that minimizes or avoids buffer memory overflow and underflow conditions, but provides aggressive sharing of transmit and receive operations with minimal loss of data. While the prior art recognizes that small buffers are desirable for many reasons, an obvious solution would be to simply increase the size of the buffer memories until the size reduces overflow and underflow conditions to a desired level. However, increasing buffer memory size increases hardware costs and imposes additional time delays in both the transmit and receive paths.

Still another solution simply improves the data speed of the system bus, by increasing the bus speed or the data path width, so that the conflicting requirements for system bus access can be met without significantly improving the buffer management technique employed. This solution also increases hardware costs and is not completely satisfactory.

It is also known that the larger the interpacket latency is (that is the time from the receipt of one packet to the transmission of the next), the lower the network performance will be. This latency is due to the number of tasks that must be performed between the receipt of one packet and the transmission of the next outgoing packet. There is a significant amount of time required for this activity. Therefore, the overall performance of the network is negatively affected when these tasks do not commence until the receive packet has been entirely received.

Some of these problems are addressed in U.S. patent application Ser. No. 08/068,696, entitled Full Duplex Buffer Management and Apparatus, filed on May 27, 1993, by awarding priority to one of a plurality of FIFOs. However, it does not always address adequately CPU utilization and bus latency problems associated with controllers in a network.

It will be appreciated from the foregoing that there is a need for a more efficient buffer memory management system for use in interfacing between a synchronous component such as a local area network and a storage device with variable latency and for reducing interpacket latency. The present invention is directed to this end.

SUMMARY OF THE INVENTION

A system for increasing the speed of receipt of data packet from a network is disclosed. The system comprises a plurality of buffer memory means; a controller means for writing data received from the network to the at least three buffer memory means; and a driver means for controlling the operation of the controller means. The driver means includes an application memory means. The controller means generates an interrupt after a first buffer memory means is filled with data from the network. The controller means writes the data from the first buffer memory means to a first portion of the application memory area responsive to the driver means. The controller means then writes data from a second buffer memory means to a second portion of the application memory area responsive to the second buffer memory means being filled with data. The controller means then writes the remaining data from the packet to a final buffer memory means. Finally, the controller means can then write the remaining data to a final portion of the application memory area.

The present invention allows for increased overall network performance. This is accomplished by allowing for certain information to be written to memory before the full data packet is received.

BRIEF DESCRIPTION OF THE DRAWINGS

FIG. 5 shows a diagram illustrating the buffer grouping of the ring descriptors in accordance with FIG. 3.

FIG. 6 shows a group of tables showing the data packet storage.

FIG. 8 shows a diagram illustrating the buffer grouping of ring descriptors in accordance with FIG. 6.

DETAILED DESCRIPTION

This present invention is related to an improvement in an ethernet controller. The following description is presented to enable one of ordinary skill in the art to make and use the invention as provided in the context of a particular application and its requirements. Various modifications to the preferred embodiment will be readily apparent to those skilled in the art, and the generic principles defined here may be applied to other embodiments. Thus, the present invention is not intended to be limited to the embodiments shown, but is to be accorded the widest scope consistent with the principles and novel features disclosed herein.

Figure 1:
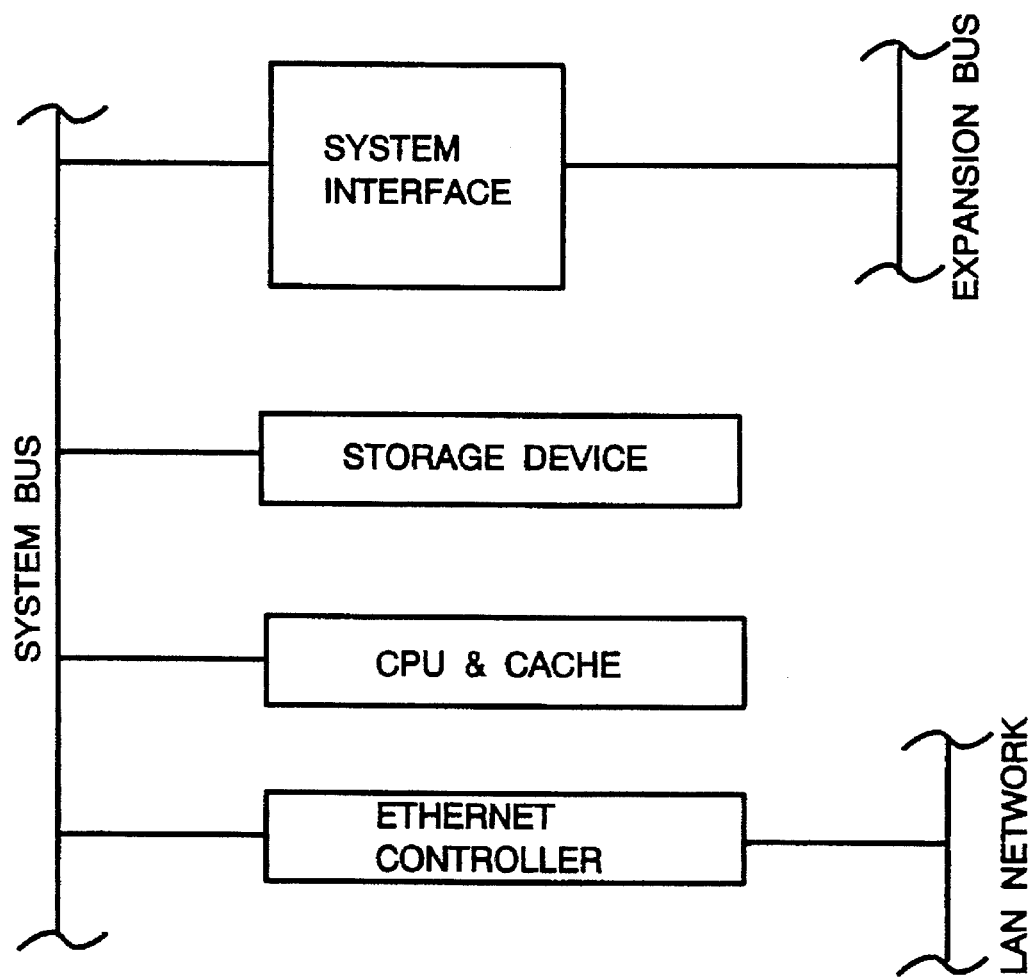
FIG. 1 is a block diagram of a node in a network.

FIG. 1 is a block diagram of a node 10 including a preferred embodiment of the present invention. Node 10 includes a system interface adapter 12 coupled to a system bus 14. The system bus 14 interconnects the system interface adapter 12 to a storage device 16, a central processing unit (CPU) 20, and an ethernet controller 22. The system interface adapter 12 allows other system peripherals to be added to the system by connecting those peripherals to the Expansion Bus 13.

A driver for the ethernet controller 22 normally requires that the CPU copy received packet data from the controller's buffer space to the application's buffer space after the entire packet has been received by the controller 22. For applications that use a ping-pong windowing style, the traffic on the network will be halted until the current packet has been completely processed by the entire application stack.

Figure 2:
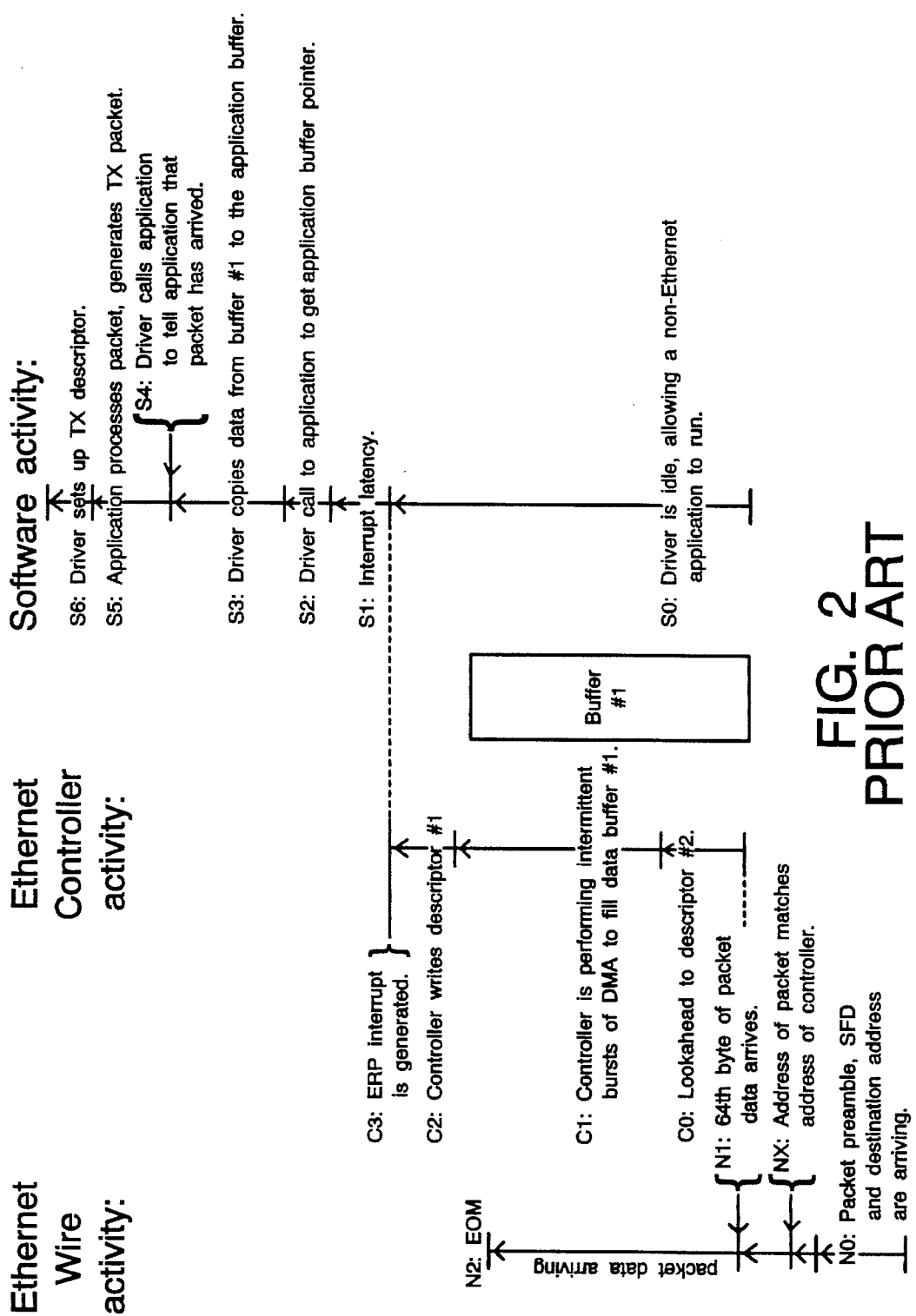
FIG. 2 shows a timeline of the operation of a prior art ethernet controller.

Referring now to FIG. 2, what is shown is a diagram relating the operation of a typical prior art ethernet controller with the operation of a software. The time between the last byte of a receive packet arriving at the client's ethernet controller and the client's transmission of the first byte of the next outgoing packet will be separated by several activities:

S1: the time that it takes the client's CPU's interrupt procedure to pass software control from the current task to the driver S2: plus the time that it takes the client driver to pass the header data to the application and request an application buffer, plus the time that it takes the application to generate the buffer pointer and then return the buffer pointer to the driver S3, S4: plus the time that it takes the client driver to transfer all of the packet data from the controller's buffer space into the application's buffer space and then call the application again to process the complete packet S5: plus the time that it takes the application to process the packet and generate the next outgoing packet S6: plus the time that it takes the client driver to set up the descriptor for the controller and then write a TDMD bit to CSR0

The sum of these times can often be about the same as the time taken to actually transmit the packets on the wire, thereby yielding a network utilization rate of less than 50%.

An important thing to note is that the ethernet controller's data transfers to its buffer space are bursted, such that the system bus is needed by the ethernet controller for approximately 4% of the time. This leaves 96% of the system bus bandwidth for the central processing unit (CPU) to perform some of the inter-packet operations in advance of the completion of network receive activity, if possible. The question then becomes: how much of the tasks that need to be performed between the reception of a packet and the transmission of the next packet can be performed before the reception of the packet actually ends at the network, and how can the CPU be instructed to perform these tasks during the network reception time?

The answer depends upon exactly what is happening in the driver and application code, but the steps that can be performed at the same time as the receive data are arriving include as much as the first 3 or 4 steps shown in the sequence above. By performing these steps before the entire packet has arrived, the network's packet throughput can be substantially increased.

A good increase in performance can be expected when the first 3 steps are performed before the end of the network receive operation. A much more significant performance increase could be realized if the ethernet controller could place the packet data directly into the application's buffer space. In order to make this work, it is necessary that the application buffer pointer be determined before the packet has completely arrived, then the buffer pointer in the next descriptor for the receive packet would need to be modified in order to direct the ethernet controller to write directly to the application buffer. More details on this operation will be provided later in this specification.

An alternative modification to the existing system can gain a smaller, but still significant improvement in performance. This alternative requires that the CPU still perform the copy operation, but it allows a large portion of the copy operation to be done before the packet has been completely received by the controller. The CPU can perform the copy operation of the receive data from the controller's buffer space into the application buffer space before the packet data has completely arrived from the network. This allows the copy operation of step 4 to be performed concurrently with the arrival of network data, rather than sequentially, following the end of network receive activity. This feature will be referred to as Start of Packet Receive Interrupt (SPRINT).

Figure 3:
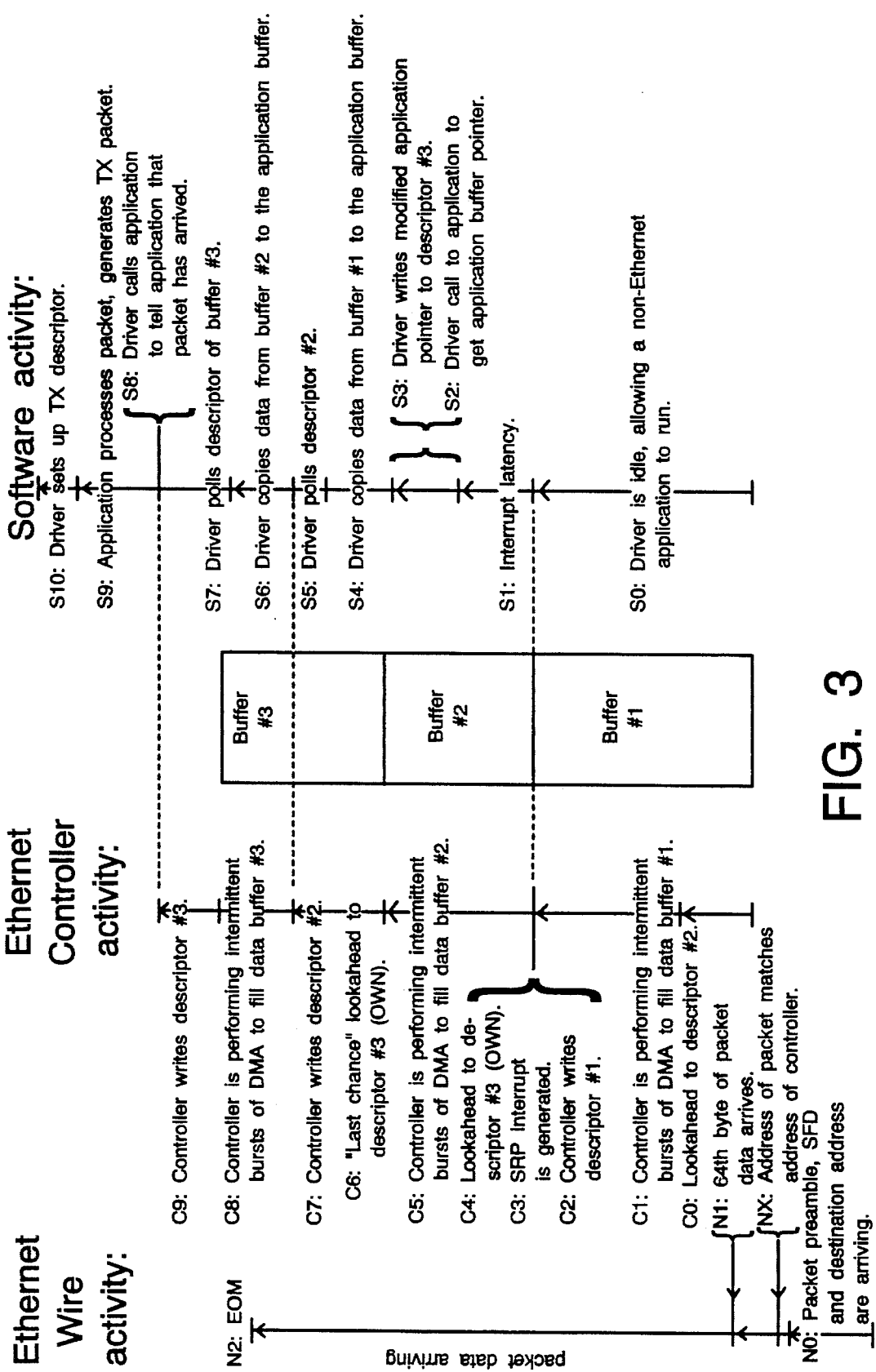
FIG. 3 shows a timeline of the operation of an ethernet controller in accordance with the present invention.

Referring now to FIG. 3, what is shown is a timeline showing the operation of a software driver in conjunction with the ethernet controller in accordance with the present invention.

N0: Packet preamble appears on the wire, followed by SFD and destination address.

N1: The 64th byte of packet data arrives from the wire. This causes the ethernet controller to begin packet data DMA operations to the first buffer.

C0: When the 64th byte of the message arrives, the ethernet controller performs a lookahead operation to the next receive descriptor. This descriptor should be owned by the ethernet controller.

C1: The ethernet controller intermittently requests the bus to transfer packet data to the first buffer as it arrives on the wire.

S0: A non-client driver task is running on the system.

C2: When the ethernet controller has completely filled the first buffer, it writes status to the first descriptor.

C3: When the first descriptor for the packet has been written, changing ownership from the ethernet controller to the CPU, the ethernet controller will generate a START OF PACKET RECEIVE INTERRUPT (i.e. STP INTERRUPT). (This interrupt appears as a RECEIVE INTERRUPT interrupt in CSRO). The software must examine the STP of the descriptor to determine if the RINT was caused by START OF PACKET INTERRUPT (STP) or END OF RECEIVE PACKET (ENP.)

S1: The STP INTERRUPT causes the CPU to switch tasks to allow the ethernet controller's driver to run.

C4: During the CPU interrupt-generated task switching, the ethernet controller is performing a lookahead operation to the third descriptor. At this point in time, the third descriptor is owned by the CPU. Even though the third buffer is not owned by the ethernet-controller, existing ethernet controllers will continue to preform data DMA into the buffer space that the controller already owns (i.e. buffer number 2). The controller does not know if buffer space in buffer number 2 will be sufficient or not, for this packet, but it has no way to tell except by trying to move the entire message into that space. Only when the message does not fit will it signal a buffer error condition.

S2: The first task of the driver's interrupt service routine is to collect the header information from the ethernet controller's first buffer and pass it to the application.

S3: The application will return an application buffer pointer to the driver. The driver will add an offset to the application data buffer pointer, since the ethernet controller will be placing the first portion of the message into the first and second buffers. (The modified application data buffer pointer will only be directly used by the ethernet controller when it reaches the third buffer.) The driver will place the modified data buffer pointer into the final descriptor of the group (buffer #3) and will grant ownership of this descriptor to the ethernet controller.

C5: Interleaved with S2, S3 and S4 driver activity, the ethernet controller will write packet data to buffer number 2.

S4: The driver will next proceed to copy the contents of the ethernet controller's first buffer to the beginning of the application space. This copy will be to the exact (unmodified) buffer pointer that was passed by the application.

S5: After copying all of the data from the first buffer into the beginning of the application data buffer, the driver will begin to poll the ownership bit of the second descriptor. The driver is waiting for the ethernet controller to finish filling the second buffer.

C6: At this point, knowing that it had not previously owned the third descriptor, and knowing that the current message has not ended (there is more data in the fifo), the ethernet controller will make a "last ditch lookahead" to the final (third) descriptor. This time, the ownership will be TRUE (i.e. to the controller), because the driver wrote the application pointer into this descriptor and then changed the ownership to give the descriptor to the ethernet controller back at S3. Note that if steps S1, S2 and S3 have not been completed at this time, a BUFF error will result.

C7: After filling the second buffer and performing the last chance lookahead to the next descriptor, the ethernet controller will write the status and change the ownership bit of descriptor number 2.

S6: After the ownership of descriptor number 2 has been changed by the ethernet controller, the next driver poll of the 2nd descriptor will show ownership granted to the CPU. The driver now copies the data from buffer number 2 into the "middle section" of the application buffer space. This operation is interleaved with the C7 and C8 operations.

C8: The ethernet controller will perform data DMA to the last buffer, whose pointer is pointing to application space. Data entering the last buffer will not need the infamous "double copy" that is required by existing drivers, since it is being placed directly into the application buffer space.

N2: The message on the wire ends.

S7: When the driver completes the copy of buffer number 2 data to the application buffer space, it begins polling descriptor number 3.

C9: When the ethernet controller has finished all data DMA operations, it writes status and changes ownership of descriptor number 3.

S8: The driver sees that the ownership of descriptor number 3 has changed, and it calls the application to tell the application that a packet has arrived.

S9: The application processes the received packet and generates the next TX packet, placing it into a TX buffer.

S10: The driver sets up the TX descriptor for the ethernet controller.

SETUP

In a preferred embodiment as shown in FIG. 5, the driver will set up descriptors in groups of 3, with the OWN and Start of Packet (STP) bits of each set of three descriptors to read as follows: 11, 10, 00.

An option bit, the SPRINT enable bit, (SPRINTEN) exists in a register. In this embodiment, it happens to reside in bit position 5 but the location is arbitrary. The software should set this bit. When set, the SPRINTEN bit directs the ethernet controller to generate an INTERRUPT when STP has been written to a receive descriptor by the ethernet controller.

The ethernet controller polls the current receive descriptor at some point in time before a message arrives. The current descriptor should have OWN=1 and STP=1. When the ethernet controller determines that this is true, it stores the descriptor information to be used when a message does arrive. If the ethernet controller finds a descriptor with OWN=0 and STP=1, it will continue to poll this location until OWN=1 and STP=1. If the ethernet controller finds a descriptor with OWN=0 and STP=0, it will skip this descriptor and move on to check the OWN and STP bits of the next descriptor in the ring.

Note that the receive packet may not be large enough to fill all three of the buffers in the 3-descriptor grouping. The software should be aware of this possibility and therefore must always examine the ENP and ERR (by O-Ring these error bits). If either ENP=1 or ERR=1, it indicates that the current descriptor contains the end of a receive packet.

Start of Packet Receive Interrupt (SPRINT) Software Requirements

Figure 4:
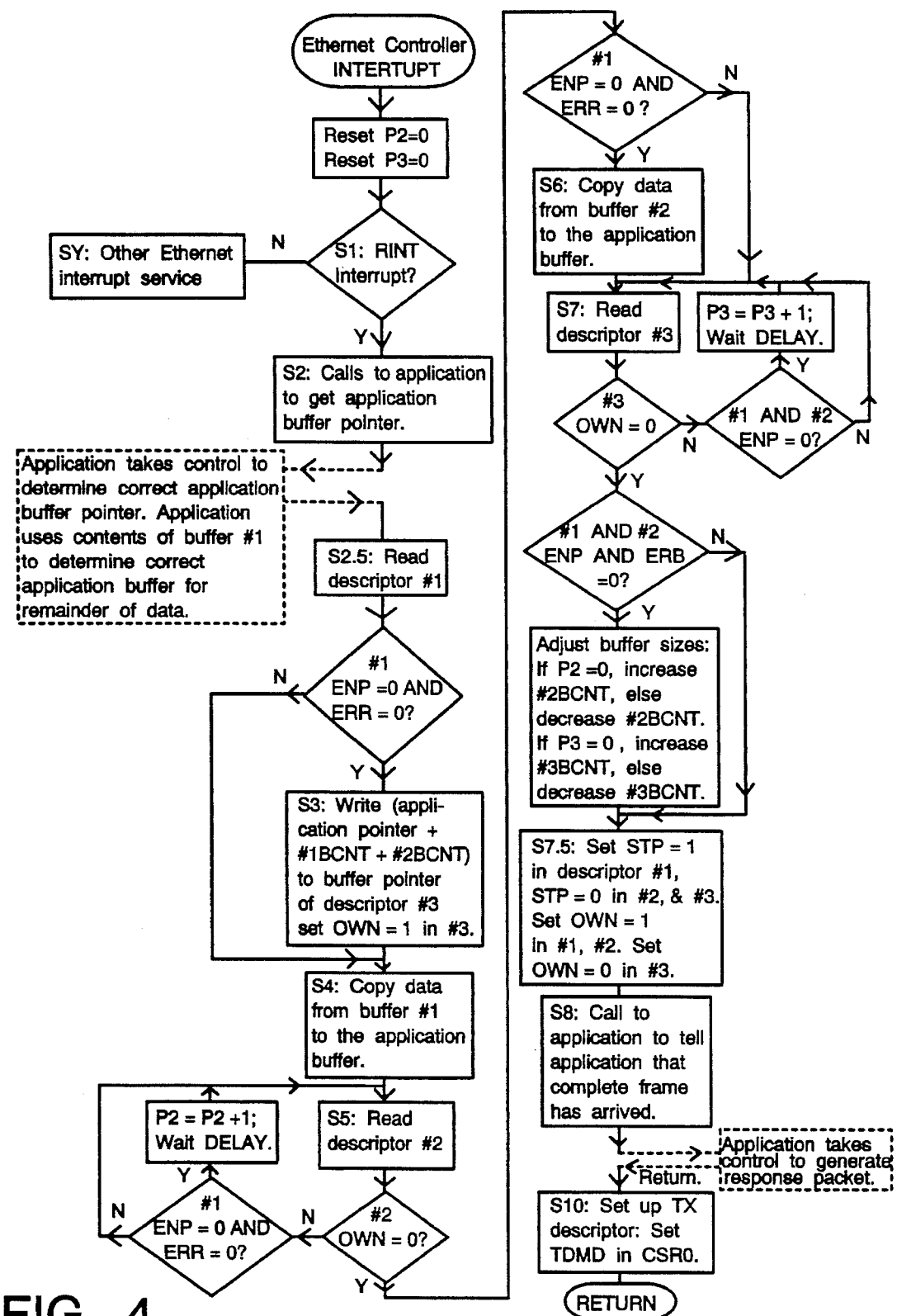
FIG. 4 shows a flow chart of the operation of a first application software when utilized with an ethernet controller in accordance with the present invention.

A software flow chart for the one-interrupt system of start of packet return interrupt is shown at FIG. 4.

The software needs to set up a receive ring with descriptors formed into groups of 3. The first descriptor of each group should have OWN=1 and STP=1, the second descriptor of each group should have OWN=0 and STP=1. The third descriptor of each group should have OWN=0 and STP=0. The size of the first buffer (as indicated in the first descriptor), should be at least equal to the largest expected header size; However, for maximum efficiency of CPU utilization, the first buffer size should be larger than the header size. It should be equal to the expected number of message bytes, minus the time needed for interrupt latency and minus the application call latency, minus the time needed for the driver to write to the third descriptor, minus the time needed for the driver to copy data from buffer #1 to the application buffer space, and minus the time needed for the driver to copy data from buffer #2 to the application buffer space.

Note that the time needed for the copies performed by the driver depends upon the sizes of the 2nd and 3rd buffers, and that the sizes of the second and third buffers need to be set according to the time needed for the data copy operations. This means that an iterative self-adjusting mechanism needs to be placed into the software to determine the correct buffer sizing for optimal operation. Fixed values for buffer sizes may be used; in such a case, the SPRINT system will still provide a significant performance increase, but the performance increase will not be maximized. The diagram shown in FIG. 5 illustrates this setup for a receive ring size of nine.

SPRINT Rules for Parsing of Descriptors

When using the SPRINT method, the software must use a modified form of descriptor parsing as follows:

The software will examine OWN and STP to determine where a RCV packet begins. RCV packets will only begin in buffers that have OWN=1 and STP=1.

Software shall assume that a packet continues until it finds either ENP=1 or ERR=1.

The software must discard all descriptors with OWN=0 and STP=0 and move to the next descriptor when searching for the beginning of a new packet; ENP and ERR should be ignored by the software during this search.

The software cannot change an STP value in the receive descriptor ring after the initial setup of the ring is complete, even if the software has ownership of the STP descriptor unless the previous STP descriptor in the ring is also owned by the software.

When SPRINTEN=1, then hardware will use a modified form of descriptor parsing as follows:

The controller will examine OWN and STP to determine where to begin placing a RCV packet. A new RCV packet will only begin in a buffer that has OWN=1 and STP=1.

The controller will obey the OWN bit for determining whether or not it may use the next buffer for a chain.

The controller will always mark the end of a packet with either ENP=1 or ERR=1.

The controller will discard all descriptors with OWN=1 and STP=0 and move to the next descriptor when searching for a place to begin a new packet. It discards these descriptors by simply changing the ownership bit from OWN=1 to OWN=0. Such a descriptor is unused for receive purposes by the controller, and the driver must recognize this. (The driver will recognize this if it follows the software rules).

The controller will ignore all descriptors with OWN=0 and STP=0 and move to the next descriptor when searching for a place to begin a new packet. In other words, the controller is allowed to skip entries in the ring that it does not own, but only when it is looking for a place to begin a new packet.

When searching for a place to begin a new packet, the controller will stop advancing through the descriptor ring when it encounters STP=1, regardless of the state of OWN. If OWN=1 with STP=1, then the descriptor information will be stored by the controller and used when the next receive packet arrives and no further reads of this descriptor location will be performed. If OWN=0 with STP=1, then the descriptor information will be discarded and the controller will continue to periodically read this descriptor location (poll the descriptor), waiting for the OWN bit to change to OWN=1.

Some Examples of SPRINT Descriptor Interaction

Choose an expected packet size of 1060 bytes.

Choose buffer sizes of 800, 200 and 200 bytes.

The descriptors will change in accordance with that shown in Table 1 of FIG. 6. Assume that a 1060 byte packet arrives correctly, and that the software reaches step S3 before the controller reaches step C6, as should be the typical sequence of events when the invention is properly implemented.

Refer now to Table 2 of FIG. 6. Assume that instead of the expected 1060 byte packet, a 900 byte packet arrives, either because there was an error in the network, or because this is the last packet in a file transmission sequence.

*Note that the ethernet controller might write a ZERO to ENP location in the 3rd descriptor. Here are the two possibilities:

(1) If the controller finishes the data transfers into buffer number 2 after the driver writes the application's modified buffer pointer into the third descriptor, then the controller will write a ZERO to ENP for this buffer and will write a ZERO to OWN and STP.

(2) If the controller finishes the data transfers into buffer number 2 before the driver writes the application's modified buffer pointer into the third descriptor, then the controller will complete the packet in buffer number two and then skip the then unowned third buffer. In this case, the ethernet controller will not have had the opportunity to RESET the ENP bit in this descriptor, and it is possible that the software left this bit as ENP=1 from the last time through the ring. Therefore, the software must treat the location as a don't care; The rule is, after finding ENP=1 (or ERR=1) in descriptor number 2, the software must ignore ENP bits until it finds the next STP=1.

Refer now to Table 3 of FIG. 6. Assume that instead of the expected 1060 byte packet, a 100 byte packet arrives, because there was an error in the network, or because this is the last packet in a file transmission sequence, or perhaps because it is an acknowledge packet.

Note that the ethernet controller might write a zero to ENP in the 3rd descriptor, except that in this case, it is very unlikely that the driver can respond to the interrupt and get the pointer from the application before the ethernet controller has completed its poll of the next descriptors. This means that for almost all occurrences of this case demonstrated in table 3, the ethernet controller will not find the OWN bit set for this descriptor and therefore, the ENP bit will almost always contain the old value, since the ethernet controller will not have had an opportunity to modify it.

Note that even though the ethernet controller will write a ZERO to the ENP location for descriptor #2 in table 3, the software should treat the location as a don't care, since after finding the ENP=1 in descriptor number 2, the software should ignore ENP bits until it finds the next STP=1.

Buffer Size Tuning

For maximum performance, buffer sizes should be adjusted depending upon the expected packet size and the values of the interrupt latency and application call latency. The best driver code will minimize the CPU utilization while also minimizing the latency from packet end on the network to packet sent to application from the driver (packet latency). These objectives are aimed at increasing throughput on the network while decreasing CPU utilization.

Note that the buffer sizes in the ring may be altered at anytime that the CPU has ownership of the corresponding descriptor. The best choice for buffer sizes will maximize the time that the driver is idle, thereby maximizing available CPU time for other applications to run, while minimizing the time from the last byte written by the ethernet controller to the time that the data is passed from the driver to the application. In the diagram, this corresponds to maximizing S0, while minimizing the time between C9 and S8 shown in FIG. 3. (The timeline happens to show a minimal time from C9 to S8.)

Note that by increasing the size of buffer number 1, we increase the value of S0. However, when we increase the size of buffer number 1, we also increase the value of S4. If the size of buffer number 1 is too large, then the driver will not have enough time to perform tasks S2, S3, S4, S5 and S6. The result is that there will be delay from the execution of task C9 until the execution of task S8. A perfectly timed system will have the values for S5 and S7 at a minimum.

An average increase in performance can be achieved if the general guidelines of buffer sizes in FIG. 5 are followed. However, as was noted earlier, the correct sizing for buffers will depend upon the expected message size. There are two problems with relating expected message size with the correct buffer sizing:

(1) Message sizes cannot always be accurately predicted, since a single application may expect different message sizes at different times, therefore, the buffer sizes chosen will not always maximize throughput.

(2) Within a single application, message sizes might be somewhat predictable, but when the same driver is to be shared with multiple applications, there may not be a common predictable message size.

Additional problems occur when trying to define the correct sizing because the correct size also depends upon the interrupt latency, which may vary from system to system, depending upon both the hardware and the software installed in each system.

In order to handle the unpredictable nature of the message size, the driver can implement a self tuning mechanism that examines the amount of time spent in tasks S5 and S7 as such: while the driver is polling for each descriptor, it could count the number of poll operations performed and then adjust the number 1 buffer size to a larger value, by adding "t" bytes to the buffer count, if the number of poll operations was greater than "x". If fewer than "x" poll operations were needed for each of S5 and S7, then the software should adjust the buffer size to a smaller value by, subtracting "y" bytes from the buffer count. Experiments with such a tuning mechanism must be performed to determine the best values for "t", "x" and "y".

Note whenever the size of buffer number 1 is adjusted, buffer sizes for buffer number 2 and buffer 3 should also be adjusted.

Note that where the typical mix of receive packets on a network for a client application is mostly large data packets, with very few small packets—such as a client that is involved in file transfers using a sliding window protocol—in this case, for maximum efficiency of buffer sizing, when a packet arrives under a certain size limit, the driver should not adjust the buffer sizes in response to the short packet. In cases where the typical client receive packet size is less predictable, then the amount of adjustment of buffer sizes (i.e. the values for "t", "x" and "y" above) probably needs to be greater. The net positive effect of the SPRINT driver will be less in such an application.

An Alternative SPRINT Flow—The TWO Interrupt Method

Figure 7:
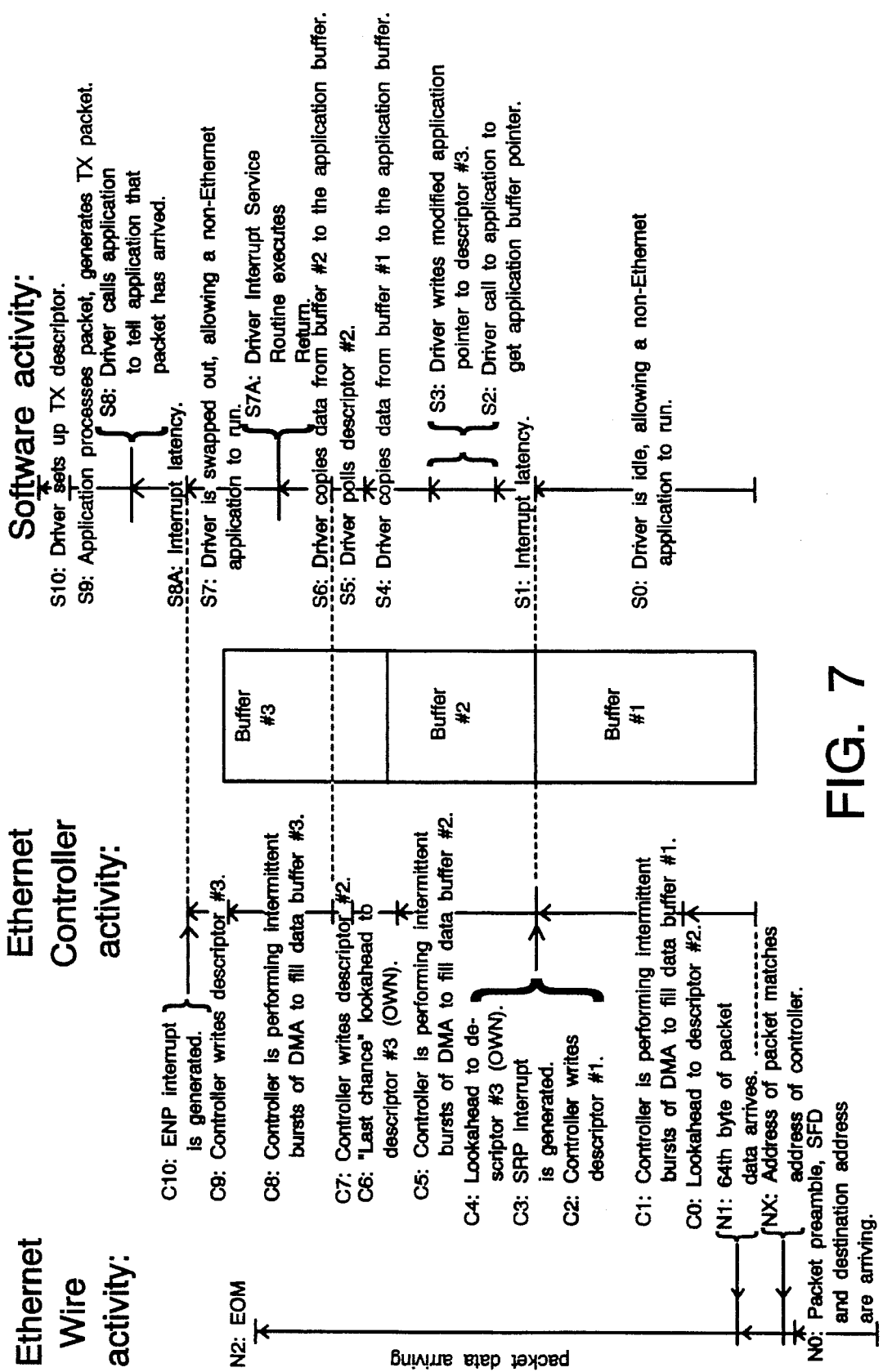
FIG. 7 shows a timeline of the operation of a second embodiment of an ethernet controller in accordance with the present invention.

An alternative to the above suggested flow is to use two interrupts as shown at FIG. 7, one at STP at C3 and one at ENP at CID, instead of just looking for the STP interrupt as was described above. This alternative attempts to reduce the amount of time that the software "wastes" while polling for descriptor own bits. This time would then be available for other CPU tasks. It also minimizes the amount of time the CPU needs for data copying. This savings can be applied to other CPU tasks.

The time from the end of packet arrival on the wire to delivery of the packet to the application is labeled as packet latency. For the one-interrupt method, packet latency is minimized, while CPU utilization increases. For the two-interrupt method, packet latency becomes greater, while CPU utilization decreases.

Note that some of the CPU time that can be applied to non-ethernet tasks is used for task switching in the CPU. One task switch is required to swap a non-ethernet task into the CPU (after S7A) and a second task switch is needed to swap the ethernet driver back in again (at S8A). If the time needed to perform these task switches exceeds the time saved by not polling descriptors, then there is a net loss in performance with this method. Therefore, the SPRINT method implemented should be carefully chosen.

The only differences in the flow between the one-interrupt and the two-interrupt methods is at steps S7A, S7 and S8A. While step S7 in the one-interrupt method represents the time spent by the driver polling for the ownership bit of the 3rd descriptor, in the two-interrupt method, step S7 is time that is available for other tasks to be running on the CPU, since at S7A, the driver is swapped out. Step S8A in the two-interrupt method is an additional interrupt latency that is required as the driver is swapped in again after the final descriptor ownership is passed to the CPU by the ethernet controller. The descriptor ownership transfer is signalled to the CPU through the interrupt of the ethernet controller.

Note that in both the one-interrupt and the two-interrupt methods, the ethernet controller will signal an interrupt for the descriptor that contains the end of the receive packet indication. The setting of the SPRINTEN bit allows the ethernet controller to generate an additional interrupt at the completion of the first descriptor/buffer of the receive packet. SPRINTEN has no effect on the generation of the interrupt for the last descriptor/buffer of the receive packet.

FIG. 8 shows the buffer sizing for the two-interrupt method. Note that the second buffer size will be about the same for each method.

Figure 9:
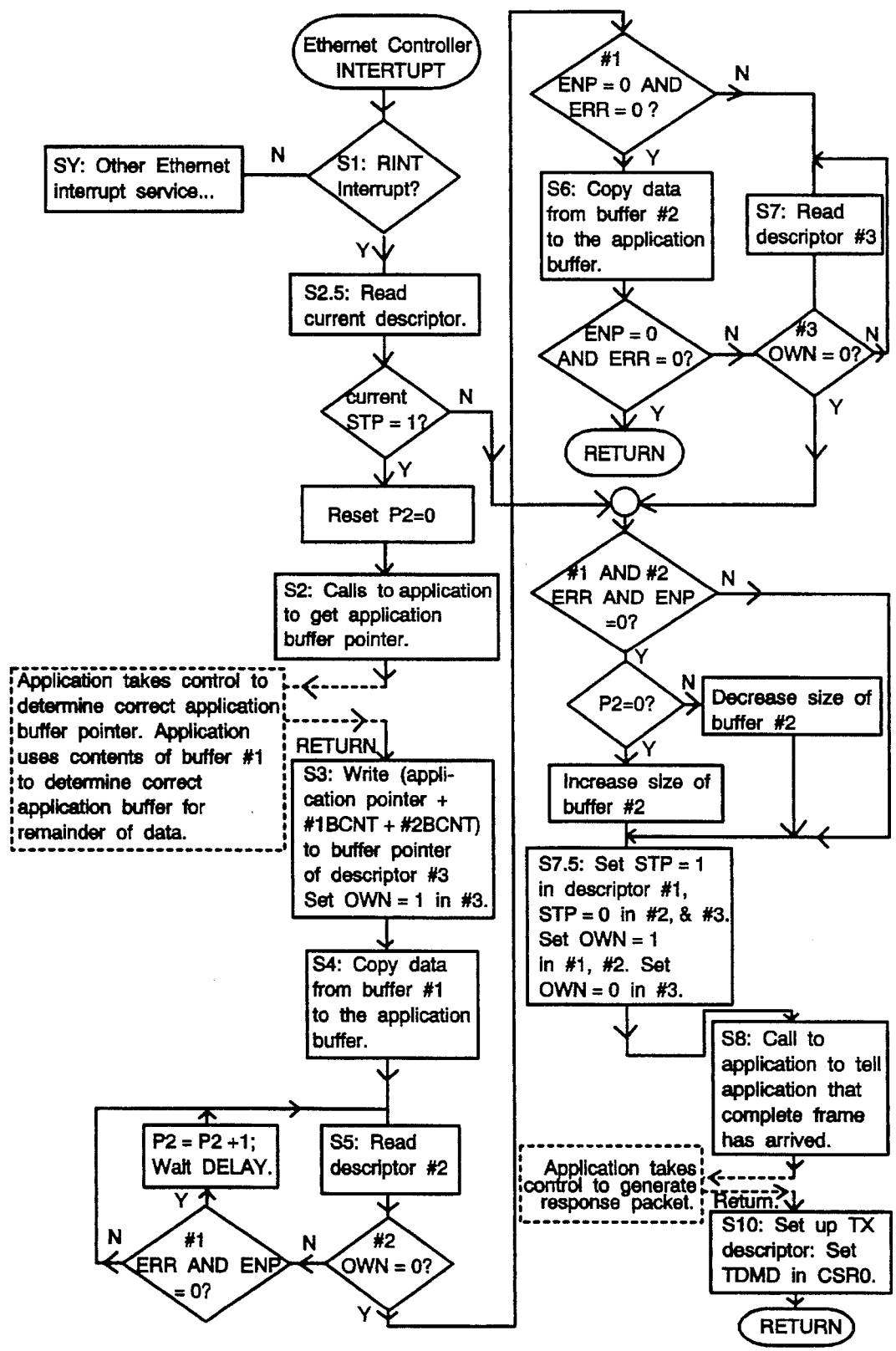
FIG. 9 shows a flow chart of the operation of a second application software when utilized with an ethernet controller in accordance with the present invention.

FIG. 9 shows the flowchart for the software for the SPRINT Two-Interrupt method.

There is another alternative which is a marriage of the two previous methods. This third possibility would use the buffer sizes set by the two-interrupt method, but would use the polling method of determining packet end. This will give good packet latency but at the price of very high CPU utilization.

And still, there are even more compromise positions that use various fixed buffer sizes and effectively, the flow of the one-interrupt method. All of these compromises will reduce the complexity of the one-interrupt method by removing the heuristic buffer sizing code, but they all become less efficient than heuristic code would allow.

Device Implementation

Preferred embodiment of the ethernet device uses microcode state machine to create the sequence of operations that is necessary to perform the controller's share of the tasks in the SPRINT flow.

Figure 10:
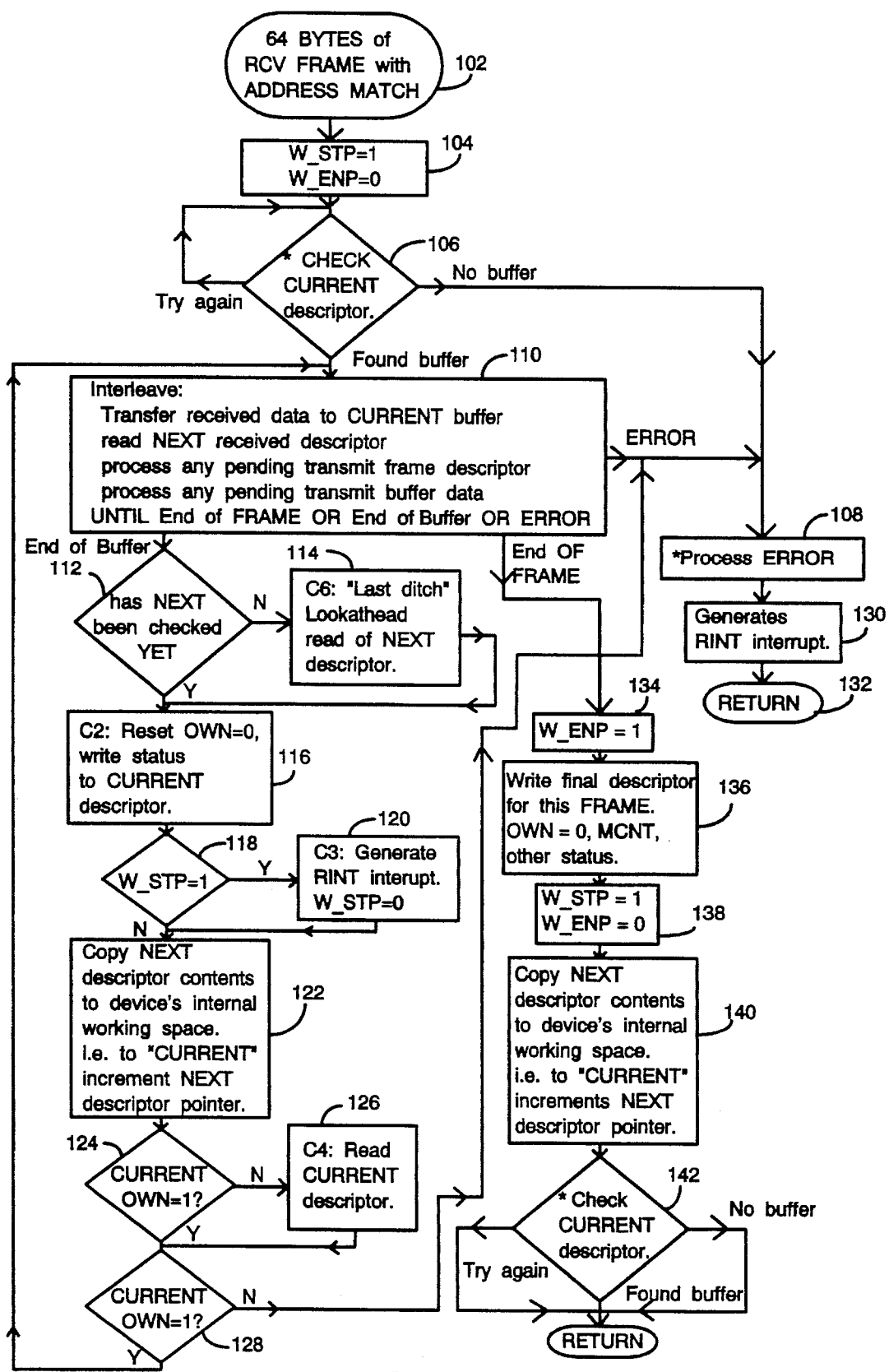
FIG. 10 shows a state diagram of the operation of the ethernet controller in accordance with the present invention.

A state diagram showing the operation of ethernet controller 22 in accordance with the present invention is shown at FIG. 10. Initially there is an address match which indicates that there is the start of a packet (STP), via step 102.

Thereafter the STP bit is set to 1 and the end of packet (END) is set to 0, via step 104. Thereafter the current descriptor is checked, via step 106. If the current descriptor is not found, try again. If no buffer is found, then an error is processed, via step 108. There is a separate subroutine for checking the current descriptor which will be described later in this application. In addition, there is a process error subroutine that will also be described later in the specification.

If a buffer is found, then an interleave step takes place via step 110. In that step, received data is transferred to the current buffer and the next received descriptor is read and all pending transmit packet descriptors and transmit buffer data are processed. A system for performing this interleave function is described in U.S. patent application Ser. No. 08/068,696 entitled "Full Duplex Buffer Management and Apparatus" which is assigned to the assignee of this application. From this interleave operation are three signals, end of buffer, an end-of-packet, and an error signal. If it is an end-of-buffer signal, that is there is no more buffer space, then the first question is has the next receive descriptor been checked yet, via step 112. If it has not been checked, then there is a lookahead read of the next descriptor, via step 114. If it has already been checked, then OWN descriptor is reset and the status of the current descriptor is written, via step 116. Then it must be determined whether STP equal 1, via step 118. If it does equal 1, then an interrupt is generated and the startup packet is changed to zero, via step 120. If it is not equal to 1, then the next descriptor contents is copied and then incremented, via step 122. After the increment takes place, it must be determined if the current descriptor OWN equal 1, via step 124. If the answer is no, then the current descriptor is read via step 126. If the answer is yes, it is again determined whether current OWN equal 1, via step 128. If the answer is yes, then return to the interleave operation, step 110 and repeat the above-identified steps. If the answer is no, then an error signal is generated and sent to step 108. The process error subroutine, via step 108 then proceeds to generate an interrupt, via step 130 and there is a return.

If the END of packet from interleave step 110 is the output, the end of packet is equal to 1, via step 134. Thereafter the final descriptor is written to the packet OWN=1 via step 136. Next, STP bit is set to 1 and the END is set to 0, via step 138. Then the next descriptor, content is copied to the device's internal working space, via step 140. The next step is to check the current descriptor again, via step 142. If the application software operates in accordance with the above scheme, many of the steps that have previously caused a latency period in the utilization of the bandwidth of the system bus will be eliminated.

Figure 11:
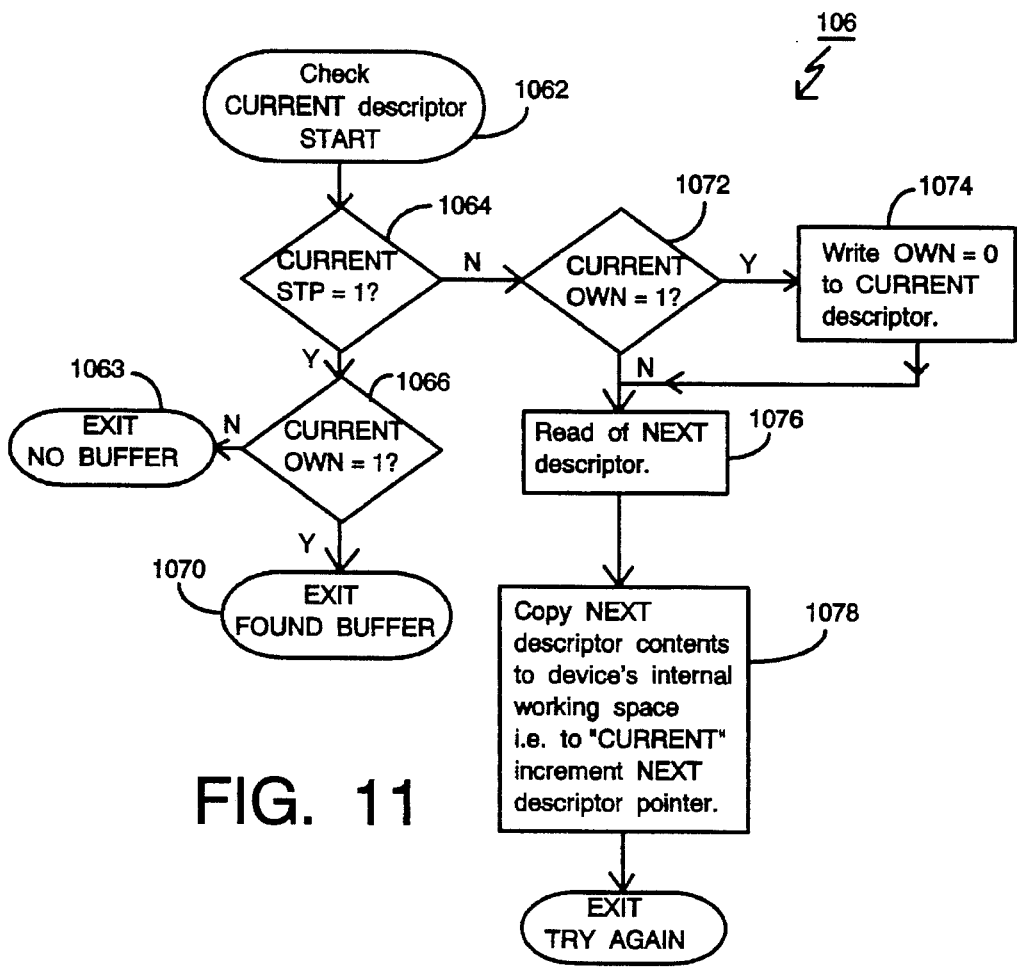
FIG. 11 shows a state diagram of "get current descriptor" subroutine in accordance with the present invention.

As has been above mentioned, there are two subroutines that must be executed to insure the adequate operation of the system, more specifically the check current descriptor routine and also the process error routine. Referring first to the check current descriptor routine shown in FIG. 11, the current STP is checked to see if it is equal to 1. If the answer STP=1 is no however, then it must be determined whether current OWN equal 1, via step 1072. If the answer is yes, then write OWN equal 0 to current descriptor, via step 1074. If the answer is yes to step 1072 or after step 1074, then the NEXT descriptor is read, via step 1076. Thereafter, the NEXT descriptors contents is written to the devices internal working space, via step 1078. If on the other hand the current STP does equal 1 via step 1064, then it mist be determined whether the current OWN descriptor is equal to 1, via step 1066. If the current OWN does not equal 1 then there is no buffer, via step 1068. If the current OWN does equal 1, then the buffer is found, via step 1070.

Figure 12:
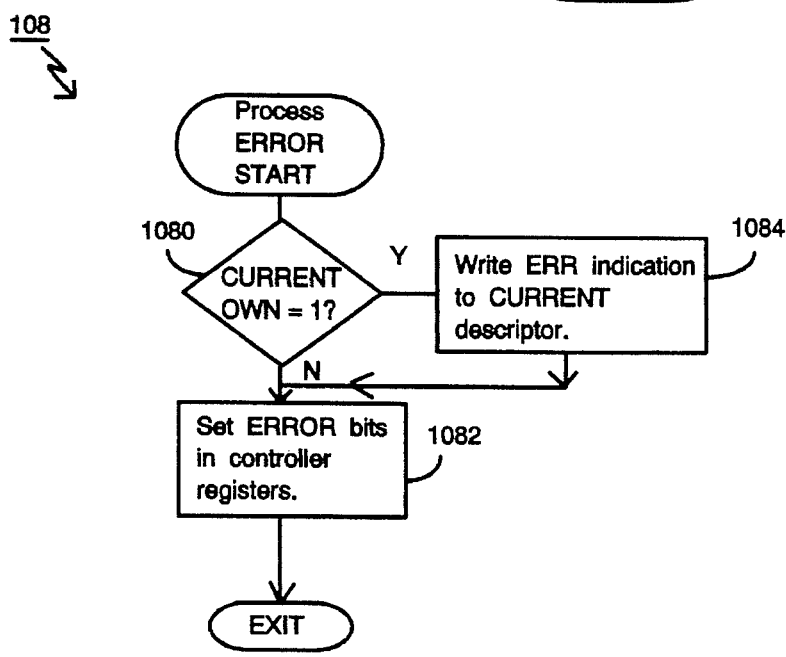
FIG. 12 shows state diagram of a "process error" subroutine in accordance with the present invention.

Referring now to FIG. 12, process error start is initiated then it must be determined if current OWN equal 1, via step 1080. If it does not equal 1, set error bits in the controller registers and exit. If it does equal 1, write error indication to current descriptor, via step 1084 and then set the error bits in the controller register via step 1082 and then exit.

This state diagram is preferably implemented in microcode. The state diagram for the 1-interrupt SPRINT and for the 2-interrupt SPRINT implementations is identical. Accordingly, through operation of the present invention, a system is shown that will appreciably increase network performance by storing data received on a network related to a particular packet before end of network receive activity. In so doing, the interpacket period of network, that is the period from the reception of one packet to the transmission of the next packet can be more efficiently utilized.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for increasing the speed at which data is received from a network comprising:

a plurality of buffer memory means;

an application memory means having a plurality of memory portions;

a controller for sequentially writing data received from the network to the plurality of buffer memory means and for generating an interrupt signal when a first buffer memory means is full;

a driver means for sequentially transferring data from the plurality of buffer memory means to the plurality of memory portions of the application memory means, the driver means being actuated upon receiving the interrupt signal whereby data transfer from the first buffer memory means to a first portion of the plurality of memory portions of the application memory means is performed while data is being written into a second buffer memory means;

a plurality of receive descriptors, the plurality of receive descriptors being set up by the driver means to indicate descriptor ownership status and start of packet status, each receive descriptor being associated with one of the plurality of buffer memory means, descriptor ownership status indicating whether the controller can write to the buffer memory means associated with the receive descriptor, and the start of packet status indicating whether a data packet can begin in the buffer memory means associated with the receive descriptor;

wherein the controller polls the plurality of receive descriptors for receive descriptor that indicates ownership of the receive descriptor by the controller and start of packet status before the controller write data into one of the plurality of buffer memory means;

wherein the controller updates the receive descriptor to relinquish ownership of the receive descriptor and to change the start of packet status after a particular one of the plurality of buffer memory means is filled; and wherein the controller performs a lookahead polling of a succeeding receive descriptor when a specified byte of the data packet is provided to the controller.

2. The system of claim 1 wherein the plurality of receive descriptors are in groups of three.

3. A system for increasing the speed at which data is received from a network comprising:

a first, second and third buffer memory means;

a controller for sequentially writing data received from the network to the first, second and third buffer memory means and for generating an interrupt signal when the first buffer memory means is full;

a driver means for transferring data from the first, second and third memory means to a first, second and third portions of an application memory means, respectively, the driver means being actuated upon receiving the interrupt signal whereby data transfer from the first memory means to the first portion of the application memory means is performed while data is being written into the second buffer memory means;

a plurality of receive descriptors, the plurality of receive descriptors being set up by the driver means to indicate descriptor ownership status and start of packet status, each receive descriptor being associated with one of the buffer memory means, the descriptor ownership status indicating whether the controller can write to the one of the buffer memory means associated with the receive descriptor, and the start of packet status indicating whether a data packet can begin in the one of the buffer memory means associated with the receive descriptor;

wherein the controller polls the plurality of receive descriptors for receive descriptor that indicates ownership of the receive descriptor by the controller and start of packet status before the controller write data into the first, second or third buffer memory means;

wherein the controller updates the receive descriptor to relinquish ownership of the receive descriptor and to change the start of packet status after the first, second or third buffer memory means is filled;

wherein before beginning the transfer of data from the first, second or third buffer memory means to the first, second or third portion of the application memory means, respectively, the driver means polls for the updated receive descriptors; and wherein the controller performs a lookahead polling of a succeeding receive descriptor when a specified byte of the data packet is provided to the controller.

4. The system of claim 3 wherein the plurality of receive descriptors are in groups of three.

5. The system of claim 4 wherein the driver means accomplishes data transfer with the use of a pointer.

* * * * *